Sept. 3, 1974  T. K JOHNSON ET AL  3,833,701
METHOD OF MAKING AN AURAL HEARING PROTECTING DEVICE
Original Filed Sept. 28, 1970  3 Sheets-Sheet 1

United States Patent Office 3,833,701
Patented Sept. 3, 1974

3,833,701
METHOD OF MAKING AN AURAL HEARING PROTECTING DEVICE
Theodore K. Johnson, Elnora, N.Y., and Joseph Sataloff, Bala-Cynwyd, Pa., assignors to Marion Health and Safety, Inc., Rockford, Ill.
Original application Sept. 28, 1970, Ser. No. 75,877, now abandoned. Divided and this application Nov. 6, 1972, Ser. No. 304,298
Int. Cl. A61f *11/02*
U.S. Cl. 264—129
9 Claims

ABSTRACT OF THE DISCLOSURE

An aural hearing protecting device of formed-in-place elastomeric composition constructed especially to provide a smooth, tight seal over the mouth of the ear canal when stretched.

---

This is a division of application Ser. No. 75,877, filed Sept. 28, 1970.

This invention relates, in general, to hearing protecting devices. It relates, more specifically, to improved aural hearing protecting devices of novel configuration and of advantageous construction. The devices are molded to the ear and permanently retain their shape. The devices are molded by hand and do not require syringes, cotton stoppers, spatulas or similar molding aids. The devices can be reused indefinitely.

BACKGROUND OF THE INVENTION

Aural hearing protecting devices of the prior art are generally formed in one of several well known configurations. They may be pre-molded from either a moldable elastomeric material such as rubber or a synthetic polymer. Wax impregnated cotton or glass wool must be remolded after each use. Among the devices formed in accordance with the prior art practice there are the well known simple, pre-molded ear plugs commonly sold in various sizes in drug stores and novelty shops. No attempt is usually made to fit these to the individual and sound attenuation is usually less than satisfactory. Somewhat more sophisticated pre-formed devices are available from safety suppliers to industry, and better results in terms of sound attenuation are obtained because usually measurements are made of the ear before selecting the proper size of hearing protector.

So far, the best permanent devices for fitting all sizes and types of ears are made by custom-molding them to conform to the subject. Such custom-molded hearing protectors provide a positive fit and are more comfortable to the subject. It is common to prepare an impression of the subject's ear, make a mold and then cast a device in the mold which, when inserted in the subject's ear, will conform to the shape thereof. Much labor can be eliminated if such custom-molded devices are formed-in-place, that is to say, cast in the ear and hardened.

In the previous procedures for preparing hearing protectors by forming-in-place, the ear canal is blocked with cotton, and a curable elastomeric composition, of about the consistency of mayonnaise, is placed in a large syringe and is injected through a nozzle into the ear canal until the ear cavity is filled to a desired quantity. After allowing a suitable time for the mass of composition to cure, the ear protector is then removed, together with the cotton block. Instead of using a large syringe, after the ear canal is blocked with cotton, a fluid, room temperature vulcanizable rubber of soft consistency can be applied with a spatula to fill the mouth of the auditory canal as well as the entire outer cavity of the ear, without however overlapping it. After vulcanizing the rubber the protector is removed from the ear and the cotton is drawn out with it and cut off. This provides the configuration of Stewart, U.S. 2,910,980. Devices prepared by such procedures conform to the normal configuration of the subject's ear.

Each of the above-mentioned devices is formed substantially in accordance with empirical design considerations having only superficial reference to ear canal configuration. The generalized ear canal configuration approximates a stretched out inverted "V" with the outer opening either the same or slightly larger in diameter than the average diameter throughout. More particularly, the ear canal forms an S-shaped curve, and is directed at first inward, forward and slightly upward; it then passes inward and backward, and lastly is carried inward, forward and slightly downward. Although it is well known that the mouth of the ear canal is subject to extreme variations in dimensional characteristics, i.e., it can be stretched and enlarged by pulling on the ear lobe or the ear's helix, for example, the prior art devices have been designed with primary consideration given to fitting the normal configuration of the ear, particularly the unstretched mouth of the ear canal. Furthermore, the formed-in-place devices of the prior art necessarily result in ear protectors which have the configuration of the normal, unstretched ear canal, because of the manner in which they are prepared, using curable compositions which are mayonnaise-like and fluid in consistency, prior to curing.

It has now been found that if a hearing protector is formed-in-place while the ear canal is stretched and enlarged, there will be provided an improved device of novel configuration which fits tighter and enhances sound attenuation substantially while retaining the positive fit and comfort of the other custom-molded hearing protectors.

It is, therefore, a primary object of this invention to provide an improved hearing protecting device of novel configuration and construction which is adaptive to the mouth of the ear canal, when the canal is stretched, for more positive fit, and enhancement of sound attenuation and comfort for the wearer.

It is another important object of this invention to provide an improved hearing protecting device of novel configuration which is formed from a silicone elastomer.

It is a further object of this invention to provide an improved hearing protecting device of novel configuration formed from a curable elastomeric composition which is of a stiff, putty-like rheology, to facilitate molding-in-place without the need to plug the subject's ear canal with cotton, maintain his head in anything but the upright position, or require devices, such as syringes to inject it, or spatulas to mold it.

Still another object of this invention is to provide an improved hearing protecting device which is reduced in size but which does not have a corresponding decrease in sound attenuation.

A further object of this invention is to provide an improved hearing protecting device which includes a handle means to facilitate easy insertion and removal.

Yet another object of this invention is to provide an improved hearing protecting device which includes a resinous coating or skin on its surface, which increases sound attenuation; minimizes collection of dirt (ear wax and the like); facilitates cleaning; provides a non-skid surface to enhance retention in the ear; and provides a neater finish to the device.

Still another object of this invention is to provide an improved hearing protecting device which includes a coating of sealant which increases sound attenuation and is more comfortable to the subject.

These and other objects and advantages of the present invention will be readily apparent from the following detailed description of several embodiments thereof and the accompanying drawings.

DESCRIPTION OF THE INVENTION

In accordance with this invention, the improved aural hearing protecting devices are designed so as to conform generally to the shape of the auricle and to the configuration of the ear canal, when stretched, for optimum attenuation of sound, especially annoying or harmful noise. Two forms of devices, each embodying the invention, are described in detail hereinafter. Each of these devices is of integral construction and is preferably formed from a silicone elastomer or other synthetic elastomeric material which is non-toxic, non-irritating and compatible with the tissues of the ear. The devices are of a configuration and construction which provides satisfactory surface coverage of the inside surface of the auricle and ear canal for sound attenuation purposes with the novel configuration designed to utilize the contractile force of the stretched ear canal in assuring a tight, smooth fit about one-quater inch wide around the entrance thereof which is supported by a tough cartilage. Utilization of a silicone elastomer, i.e., a polyorganosiloxane, in their fabrication not only substantially eliminates physiological complications which may result from utilization of the devices, but provides the elastomeric characteristics, i.e., toughness, reilience and flexibility, essential for optimum effectiveness of the novel configuration. This material also permits the devices to be molded in the desired configuration under essentially room temperature conditions. Other synthetic materials will also be usable in the present devices so long as they are non-irritating and possess the suitable elastomeric properties.

Figure 1:
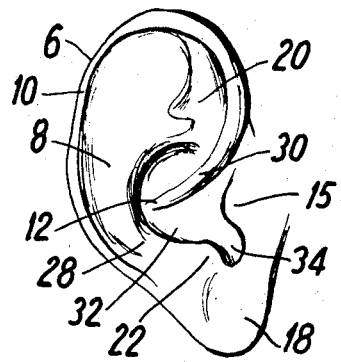
FIG. 1 illustrates the auricle, i.e., the lateral surface of the external ear, showing the numerous eminences and depressions thereof.
Figure 7:
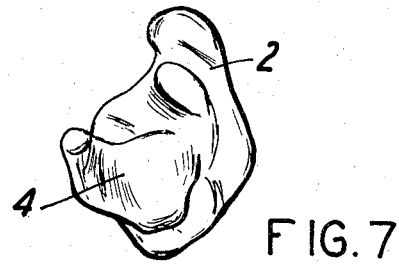
FIG. 7 shows one embodiment of this invention which has a protuberance matching the size of the ear canal in its stretched configuration, the outer portion of which is large enough to cover the entire auricle.

Having reference to the drawings, FIG. 7 illustrates a first form of the improved hearing protecting devices embodying the invention. This form of the device comprises an integral body having a single structural member formed to fit the configuration of the entire auricle and the mouth of the ear canal when stretched. In general, the shape consists of an outer part 2 which fits into the auricle 6, (FIG. 1), i.e., the projecting portion of the external ear, and a protuberance 4 which fits into the mouth of ear canal 16 (FIGS. 4 and 5) when stretched. In this embodiment, the size and shape of outer part 2 is determined by the size and shape of the corresponding parts of the ear because the device is molded-in-place. So too, the shape of protuberance 4 will conform to the shape of the ear canal, when stretched, and the length will be at least such that the area supported by tough cartilage 14 at the entrance to the ear canal is sealed when the protector is inserted therein. The length of protuberance 4 is not critical so long as the required tight seal is provided—in most subjects from about ¼ to about 9/16 in. is satisfactory. It is preferred however that the protuberance not extend far into the canal, because the skin, next to the temporal bone and unsupported by cartilage, is more tender and comfort is impaired. The embodiment shown in FIG. 7 includes outer portion 2 which completely fills auricle 6 (FIG. 1) of the ear. This auricle, the projecting portion of the external ear, comprises the helix 10, antihelix 8, fossa of the antihelix 20, antitragus 22, tragus 15, lobe 18 and concha 12. Concha 12 is partially divided into two parts by crus 28 or commencement of the helix, the upper part termed cymba conchae 30 and the lower part cavum conchae 32. Between tragus 15 and antitragus 22 is the intertragic notch 34. In addition to covering all of these parts of the ear, protuberance 4 covers the stretched mouth of the ear canal 16.

Figure 8:
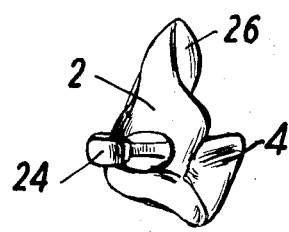
FIGS. 8 and 8A show one preferred embodiment of this invention, front and back perspective views, respectively, which has a protuberance matching the size of the ear canal in its stretched position, the outer portion of which covers only a minimal area of the auricle.
Figure 8A:
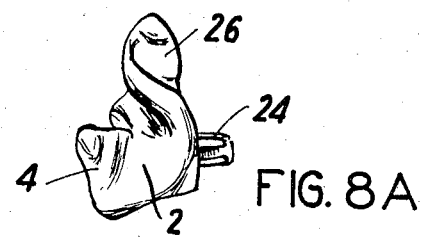

The second embodiment of the invention, see FIGS. 8 and 8A, is of specifically different configuration, but possesses certain structural elements in common with the first embodiment and provides the same advantages. This modified form of the hearing protecting device also comprises an integral body which is formed to include protuberance 4 shaped to fit the ear canal when stretched. As to outer part 2, however, it has surprisingly been found unnecessary to completely cover the auricle of the ear. It is disclosed in U.S. 2,910,980, for example, that if the protector covers less area than the antihelix, the fossa of the antihelix, the tragus, the antitragus and the concha as well as the mouth of the ear canal, there will be a corresponding decrease in sound attenuation. In fact, however, if protuberance 4 is shaped to fit the stretched ear canal, a substantial decrease in the size of outer portion 2 is possible without a corresponding decrease in sound attenuation. The bulk and weight of such an embodiment is less and comfort is correspondingly increased. The preferred embodiment of FIGS. 8 and 8A covers an area coextensive with and no greater than that of the concha, 12, the tragus, 15, the antitragus, 22, and the upper forward portion of the antihelix 8 (represented in FIG. 8 by portion 26) as well as that portion of the mouth of ear canal 16 which is supported by cartilage 14 when stretched, as shown in FIGS. 4 and 5.

Figure 4:
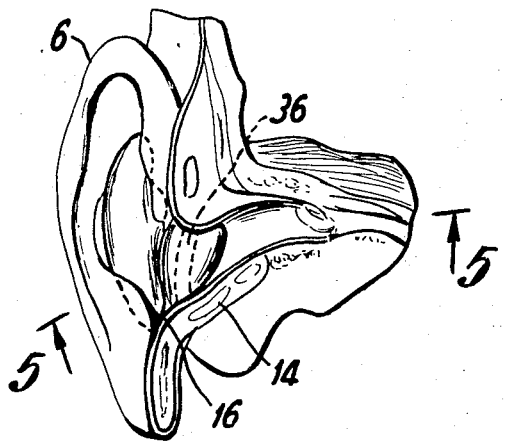
FIG. 4 is an elevation, partially in section, of the ear shown in FIG. 2, illustrating the ear canal in the stretched configuration contemplated by this invention, and showing a hand-molded hearing protector according to this invention extending into the canal.
Figure 5:
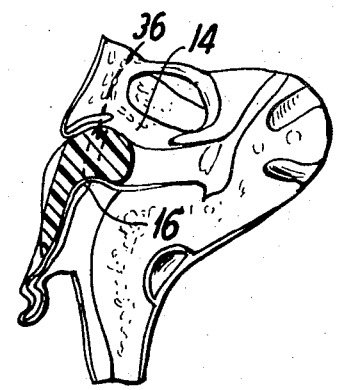
FIG. 5 is a horizontal section through the ear and canal of FIG. 4 along line 5—5; upper half of section.

It is a feature of the hearing protectors of this invention to provide a tightly fitting obstruction at the external orifice of the stretched ear canal (dashed area 36, FIGS. 4 and 5). This prohibits the passage of sound into the ear canal. It is seen in FIGS. 4 and 5 that to effect this seal, hearing protectors according to this invention follow the walls of the concha and extend into the ear canal slightly beyond the cartilage regions of the tragus and eminentia conchae. However, they do not extend so far into the ear canal as to cause pressure on the temporal bone. even during its movement, e.g., during chewing.

In the embodiments shown in FIGS. 4, 8 and 8A, the outer surface of the hearing protector is finished as essentially a flat plane existing entirely within the concha cavity and intertragic notch. The elastomeric material partly fills the concha in the cymba conchae, cavum conchae and intertragic notch areas. It is preferred to use only a sufficient amount of elastomeric composition to give strength and rigidity to the final product. This results in about a ¼ to ⅜ inch depth of elastomer over the crus section of the helix.

While the seal area on the hearing protector according to this invention has a tight fit in the stretched ear canal, this is not sufficient by itself to hold the seal during excessive movement of the face, jaws and ear. As mentioned above, it is intended that the hearing protector be shaped to be held in the fixed position at least by the fossa triangularis and crus section of the helix; the tragus; antitragus; concha; and the cartilaginous part of the stretched external acoustic meatus (ear canal).

Figure 6:
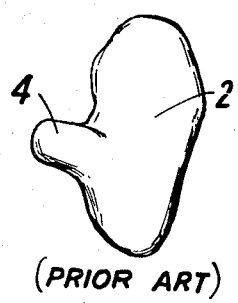
FIG. 6, for comparison purposes, shows a hearing protector not according to this invention, which is characterized in having a protuberance which matches the size of an unstretched ear canal, the outer portion of which is large enough to cover the entire auricle.

On the other hand, devices molded-in-place using soft, mayonnaise-like, elastomers (FIGS. 2, 3 and 6) are designed to obtain a comfortable, long seal against the external, unstretched ear canal. This is not a tight, positive fit and so does not attenuate sound as well as the protectors of the present design. Test results shown in FIG. 9, and to be described later, show that a long seal is not as effective as a short, tight seal.

Figure 2:
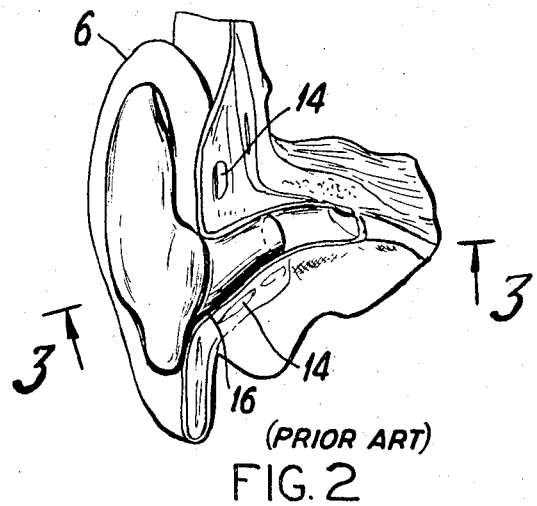
FIG. 2 is an elevation, partially in section, of an ear taken longitudinally of the ear canal illustrating the ear canal in the normal, unstretched configuration, and showing a molded-in-place hearing protector, not according to this invention, extending into the canal.
Figure 3:
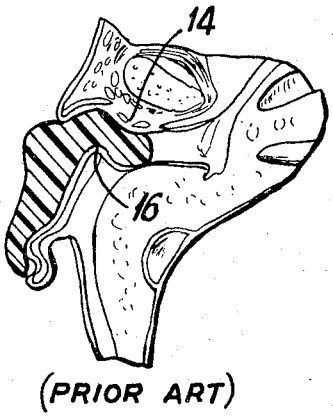
FIG. 3 is a horizontal section through the ear and canal of FIG. 2 along line 3—3; upper half of section.

The long seal of the molded-in-place device, using soft elastomer, is provided by having it follow the walls of the cavum conchae and intertragic notch near the entrance to the ear canal, and extend into the ear canal ½ to ¾ inches (FIGS. 2 and 3). It usually fills the canal to include a portion of the region next to the temporal bone. In order to avoid irritation of the thin layer of skin covering the temporal bone it must avoid a tight fit and requires the use of elastomers of soft rheology. In contrast, as has been mentioned, the present devices are held in place in an entirely novel manner employing the contractile forces set up by stretching the ear canal.

It is believed that the better attenuation achieved with the novel configurations of this invention is due to the following factors:

(a) the external acoustic meatus is soft and flesh-like in rheology;

(b) a loose fitting aural hearing protcetor vibrates in the ear canal because it "floats" on a support of soft flesh. The movement of such a device, due to external sound waves, will regenerate new sound waves inside the canal;

(c) when a tight fit is approved in the canal with the present configurations, the flesh is compressed so that the ear protector is not as free to move as it is when suspended on soft flesh; and (d) the optional addition of a sealant helps produce a tighter fit. A thin coating, i.e., 0.005 in. will not improve sound attenuation. However, a heavy, thick, i.e., at least 1/64 to 1/32 in. coating of a viscous sealant causes substantial improvement.

Also shown in the embodiment of FIGS. 8 and 8A, is optional handle means 24. This can be of any convenient design and construction to aid in grasping the device to facilitate insertion and removal. One such means comprises a rubber handle affixed to the protector. For example, a soft and flexible handle can be pre-molded and bonded to the body of the ear mold material during the cure process. Alternatively, a handle can be shaped from the body of the ear mold material during the molding process. An elastomeric material is preferred for the handle because it will give in the event that the wearer is hit in the area with a hard object. However, handles can also be made from string, cloth, soft plastic and similar materials. Metal or hard plastic handles should be avoided because they could act as a projectile or lever and cause ear damage if the wearer is struck with a hard object. It is especially preferred to use a pre-molded silicone rubber handle because this will chemically bond to the ear mold during curing and no adhesive is required for securing the handle.

As previously indicated, the material desirably utilized for formation of the hearing protecting devices of this invention is a synthetic polymer. Specifically, a silicone polymer (organopolysiloxane) has been found particularly suitable for this application. An important reason for the selection of this specific material is the lack of irritation, ease of cleaning, stability towards secretions and a wide variety of environmental conditions. The silicone polymers can be formulated to have the desired elastomeric characteristics for this application. It is only necessary that the devices have adequate structural rigidity to assure retention within the ear coupled with flexible, elastomeric properties which allow the ear protector to follow the ear canal during movement and thereby insure a tight seal.

It is preferred to utilize silicone rubber formulations that vulcanize or cure at or near room temperature. Such formulations are well known and are described, for example, in U.S. 2,843,555 and 3,127,363 (especially Examples 19–21), the disclosure of which are incorporated herein by reference.

Especially preferred formulations comprise curable organopolysiloxanes of the above general room temperature vulcanizing type which have been formulated to a stiff, putty-like consistency so that they can be catalyzed and molded in place without tilting the head, or using cotton blocks, and with the other advantages noted above for such rheology. In addition, tighter fits at the critical stretched ear canal area are more easily obtained with such formulations than can be achieved with curable silicone resins in soft or liquid-like states. Such formulations are disclosed in the copending application of Warren R. Lampe, entitled "Room Temperature Vulcanizable Silicone Rubber Compositions," filed on the same day as the present application under Attorney's Docket No. 8SI–1133, the disclosure of which is incorporated herein by reference.

A suitable putty-like composition consists of:

(a) a linear, high molecular weight fluid organopolysiloxane containing terminal silicon bonded hydroxy groups and having a viscosity of $3 \times 10^6$ to $2 \times 10^8$ centipoise when measured at 25° C., the organic group of the organopolysiloxane representing monovalent hydrocarbon radicals;

(b) 0–100% by weight of said high molecular weight organosiloxane of a low molecular weight fluid organopolysiloxane containing terminal silicon bonded hydroxy groups and having a viscosity within the range of 100 to $3.0 \times 10^5$ centipoise at 25° C. wherein the organic groups of the low molecular weight organopolysiloxane represent monovalent hydrocarbon radicals;

(c) a filler;

(d) an alkyl silicate selected from the class consisting of (1) a monomeric organosilicate corresponding to the general formula

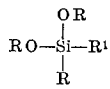

where R is a radical selected from the class consisting of alkyl, haloalkyl, aryl, haloaryl, aralkyl, alkenyl, cycloalkyl, cycloalkenyl, and cyanoalkyl radicals and $R^1$ is selected from the class consisting of alkyl, haloalkyl, aryl, haloaryl, alkenyl, cycloalkyl, cycloalkenyl, cyanoalkyl, alkoxy and aryloxy radicals or (2) a liquid partial hydrolysis product of the aforementioned organosilicate monomeric compounds and (e) a metallic salt of an organic monocarboxylic or dicarboxylic acid in which the metal ion is selected from the class consisting of lead, tin, zirconium, antimony, iron, cadmium, barium, calcium, titanium, bismuth and manganese.

In comparison with previous formulations, a stiff formulation gives better sound attenuation characteristics because during the molding process, the ear canal is pulled to stretch it larger. Then the "stiff" putty is inserted and packed to obtain a tight fit. The ear is then released; but the stiff putty retains pressure against the cartilage area at the entrance of the ear canal, where the seal is desired, while the silicone is curing. Because the "stiff" consistency allows the tight fit to be maintained during the cure process, the ear can be released with no further attention. Soft or liquid-like formulations can be used to prepare the devices of this invention, but they are not preferred, because they do not assist the ear canal to remain stretched during curing. However, the use of such materials will be facilitated if a device is employed to hold the liquid-like material under pressure during the curing process. This is one way to permit molding with the ear in the stretched position.

To fit subjects with mold-in-place hearing protectors according to this invention, the following preferred steps are taken:

(a) the outer ear is cleaned, if necessary, with a cotton swab;

(b) the curable elastomeric composition is catalyzed, if necessary, and if in the form of a putty, is kneaded until well mixed;

(c) the composition, before it has cured, is packed into the opening of the ear canal, which has been stretched, for example, by gently, but firmly, pulling the helix of the ear backwardly, outwardly and upwardly. It is preferred to insert a cone of "silicone putty" into the ear canal then, using a circular motion of the finger, press it in order to seal the putty tightly into the entrance of the stretched ear canal. When the cone of putty is inserted in the ear, care must be observed not to close off the mouth of the canal in such a way as to entrap air. Such trapped air will build up pressure during the formation of the seal and prevent making a good seal. It is essential that the silicone putty forms a tight, smooth seal about one-eighth to one-quarter inch wide around the entrance of the ear canal which is supported by tough cartilage;

(d) the remaining silicone putty is molded tightly into serted into the ear canal, being certain that it is tight against the skin of the concha and up into the antihelix section of the ear (FIG. 4). It is important to avoid folds in the putty, which will weaken the final cured device.

If enough putty is used to fill the entire auricle, a device of the design shown in FIG. 7 will be obtained. If, on the other hand, only enough putty is used to cover the concha, the tragus, the antitragus, and the upper forward portion of the antihelix, i.e., the putty is not extended into the helix, the embodiment of FIGS. 8 and 8A will be formed.

The procedure is repeated for the other ear. Ordinarily it is preferred to have the composition moldable to the shape of the ear within about 3 to 6 minutes after mixing. Cure to a permanent shape can take place during the next 10 to 15 minutes or so, during which the subject is free to return to his duties. These times are merely illustrative and not critical, and are variable with the particular formulation employed and such can be adjusted by those skilled in the art to meet any desired needs.

It is convenient to provide the silicone composition in a flexible mixing bag containing catalyst in a rupturable pouch. The composition is prepared by squeezing the bag to rupture the pouch of catalyst and kneading to mix it into the polyorganosiloxane. When well mixed, the bag can be cut open and fitting begun.

In the embodiments using a handle means, a silicone rubber handle can be inserted into each ear impression while the silicone putty is still soft. After cure, the cured rubber should be chemically bonded to the base of the handle.

Sound attenuation is improved by at least 10 decibels (dBA) at 500 cycles per second and a smooth finish is provided if a coating, e.g., thickness of about $1/64$ inch to $1/32$ in., of sealant is applied to the hearing protecting device. Such a sealant can be, for example, petrolatum or a similar viscous, grease-like material or an emulsion of a bland vegetable oil, bland animal oil or heavy mineral oil. Many suitable organic creams suitable for sealant purposes are familiar to those skilled in the art.

A permanent, attractive surface is achieved if the devices are provided with a thin resinous layer, e.g., by coating in a catalyzed organopolysiloxane composition and allowing the composition to cure. With such coatings an increase of about 5 dBA attenuation is achieved at 500 cycles per second. Such compositions can be made by those skilled in the art and are disclosed, for example, in the copending application of Harvey P. Shaw, entitled "Solutions of Room Temperature Vulcanizable Silicone Rubber Compositions" filed on the same day as the present application under Attorney's Docket No. 8SI-1134, the disclosure of which is incorporated herein by reference.

The finished hearing protectors can be inserted by pulling down on the ear lobe or up on the top part of the ear, to stretch the ear canal so that the hearing protector will go in easily. Using a twisting motion (so the top of the protector is going toward the front of the head) the protector is pushed into the ear. It is important that a good seal is obtained and the protector is tucked into the upper forward portion of the helix. The hearing protectors are conveniently kept in a carrying case when not in use.

The hearing protectors constructed according to this invention have been compared to commercial ear plugs and to formed-in-place devices with the configuration of the unstretched canal. The test procedure was essentially in accordance with American Standard Association Number Z 24.22-1957. The test was carried out as follows:

A subject, who has essentially no hearing loss, is seated in a free sound field within an anechoic chamber looking directly at a loudspeaker. A pure tone frequency is directed toward the subject, who is not wearing hearing protectors. The threshold (lowest loudness) reading is recorded. The hearing protectors are then inserted into both ears of the subject and the test procedure is repeated. The insertion loss in decibels is calculated at various frequencies and the data are plotted.

The tests were conducted in two different test centers and good correlation of results were achieved between the two laboratories.

For the purpose of the test, four devices were prepared:

(A) Was an aural hearing protector according to this invention, hand-molded in the stretched ear canal using a stiff silicone putty as described in the steps outlined above. Fourteen sets of such hearing protectors were tested on 11 different subjects.

(B) Was an aural hearing protector, according to this invention, substantially the same as (A), but including a dip coated layer of cured organopolysiloxane resin. Seven sets of such hearing protectors were tested on 4 different subjects.

(C) was an aural hearing protector, also according to this invention, substantially the same as (A), but including a thick coating of sealant (petrolatum). Fourteen sets of such protectors were tested on 11 different subjects.

(D) Was an aural hearing protector, not according to this invention, syringe-molded in the unstretched ear canal using a "mayonnaise-like" silicone, according to the prior art. Four sets of such hearing protectors were tested on four different subjects.

Figure 9:
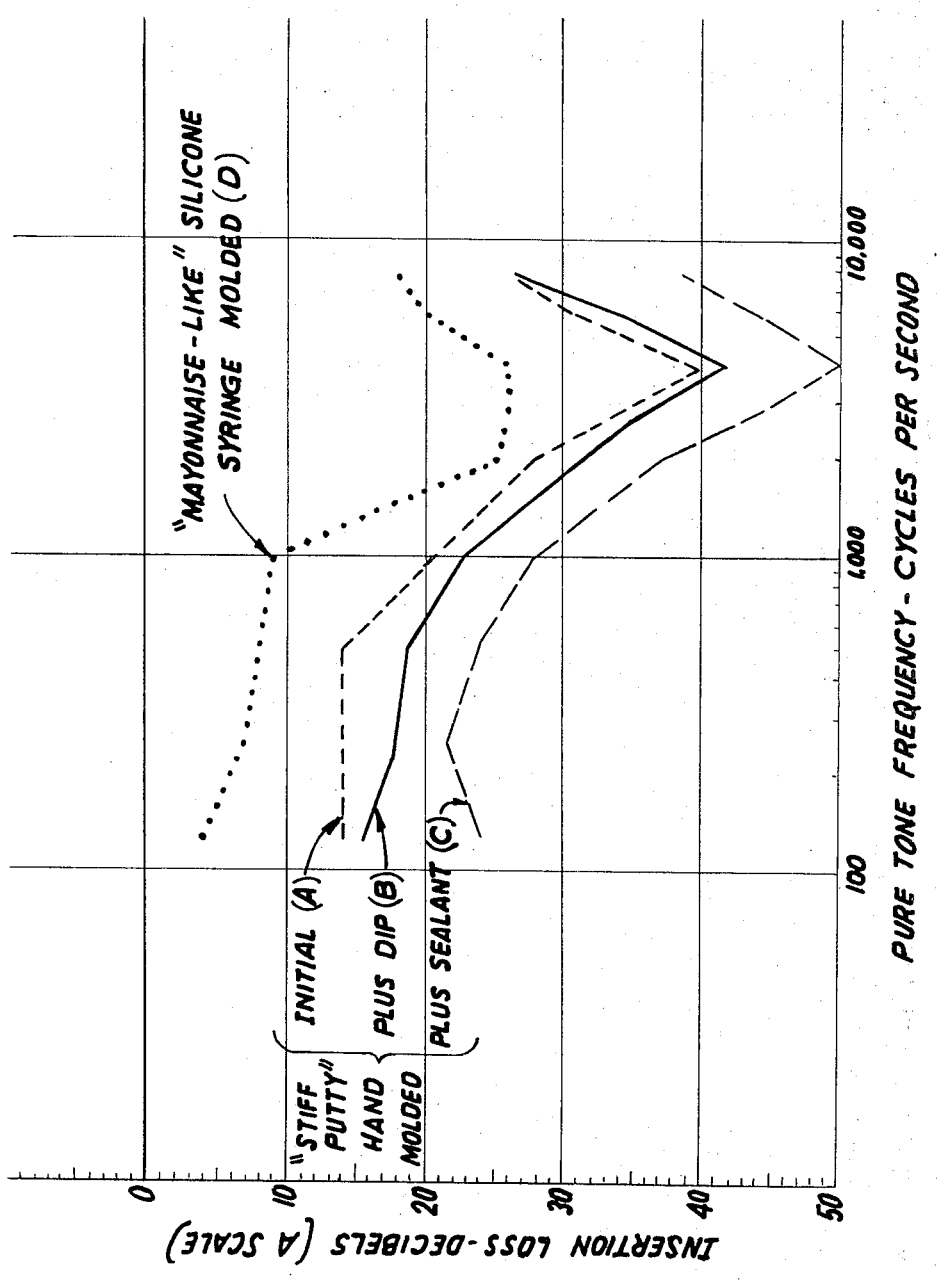
FIG. 9 presents in graphical form data comparing the sound attenuation efficiency of hearing protectors hand-molded in accordance with this invention with that of typical hearing protectors that have been molded according to previous procedures without stretching the ear canal.

The results of testing and averaging the test data are set out in Table 1 and represented graphically in FIG. 9:

TABLE 1.—SOUND ATTENUATION PERFORMANCE OF MOLD-IN-PLACE HEARING PROTECTORS

| | Insertion loss (dBA) | | | |
|---|---|---|---|---|
| | Stiff rheology, hand-molded | | | Soft rheology, syringe molded |
| | (A) | (B) | (C) | (D) |
| Pure tone frequency (cycles/sec.) | Initial | Plus dip | Plus sealant | Initial |
| 125 | 14 | 16 | 24 | 4 |
| 250 | 14 | 18 | 22 | 7 |
| 500 | 14 | 19 | 24 | 8 |
| 1,000 | 21 | 23 | 28 | 9 |
| 2,000 | 28 | 31 | 37 | 25 |
| 3,000 | 35 | 36 | 45 | 26 |
| 4,000 | 40 | 42 | 50 | 26 |
| 6,000 | 31 | 34 | 44 | 20 |
| 8,000 | 26 | 26 | 39 | 18 |

The lowest degree of insertion loss (hearing protection) was provided by syringe molded device, D (not according to this invention). This was not molded in the stretched ear canal. The other three curves in FIG. 9 are obtained with the hand molded devices according to this invention. At 500 cycles per second, the uncoated protector (A) provided an insertion loss of 14 dBA (compared to 8 dBA for syringe molded device, D). The silicone resin coating (device B) increased the insertion loss to 19 dBA and a coating of sealant (device C) increased it to 24 dBA.

The unexpected superiority in attenuating noise shown by the hearing protectors of the present invention in comparison with the other custom-molded typical hearing protector is readily apparent.

The principles of this invention have been explained and have been illustrated and described in what are now considered to represent the best embodiments. However, it is obvious that the teachings are applicable to the design or construction of aural devices other than those which primarily protect hearing. For example, positive fitting and comfortable hearing aid molds, ear pieces for dictating and transcribing devices or for stereo headsets or telephone operator's apparatus, protective aids for swimmer's ears, and the like can be produced. It is to be understood that, within the scope of the appended claims, the invention may be practiced otherwise than as specifically illustrated and described.

What is claimed is:

1. A process of producing a formed-in-place hearing protector for the human ear which comprises stretching and enlarging the ear canal by physically pulling on the outer part of the ear, packing a portion of a composition which comprises a non-irritating curable synthetic elastomer having a stiff putty-like consistency into the opening of said ear canal to form a protuberance extending into the ear canal, said portion being packed into said ear canal while the latter is kept stretched by continued pulling on the outer part of the ear, and completing the formation of the hearing protector by pressing the remaining portion of the composition into the auricle and allowing said composition to cure to the shape of the ear while said ear canal is in a stretched condition whereby said protuberance conforms to the stretched canal.

2. A process as defined in Claim 1 wherein the curable synthetic elastomer consists essentially of an organopolysiloxane.

3. A process as defined in Claim 1 wherein the protuberance extends into the ear canal slightly beyond the cartilage regions of the tragus and the eminentia conchae.

4. A process as defined in Claim 1 wherein the hearing protector covers an area co-extensive with and no greater than that of the concha, the tragus, the antitragus, the upper, forward portion of the antihelix and that portion of the ear canal which is supported by cartilage when stretched.

5. A process as defined in Claim 1 including the additional step of affixing handle means to the curable synthetic elastomer before said elastomer cures to a permanent shape.

6. A process as defined in Claim 1 including the additional step of dip-coating a resinous layer of a catalyzed organopolysiloxane composition onto the surface of the hearing protector.

7. A process as defined in Claim 1 including the additional step of coating a layer of sealant onto the surface of the hearing protector.

8. A process as defined in Claim 6 including the additional step of providing a coating of a sealant on the surface of the hearing protector.

9. A process of producing a formed-in-place hearing protector for the human ear which consists essentially of stretching and enlarging the ear canal by physically pulling the helix of the ear backwardly, upwardly and outwardly, packing a portion of a composition which comprises a non-irritating curable synthetic elastomer having a stiff putty-like consistency into the opening of said ear canal to form a protuberance extending into the ear canal, said portion being packed into said ear canal while the latter is kept stretched by continued backward, upward and outward pulling on the helix, and completing the formation of the hearing protector by pressing the remaining portion of the composition into the auricle and allowing said composition to cure to the shape of the ear while said ear canal is in a stretched condition whereby said protuberance conforms to the stretched canal.

References Cited
UNITED STATES PATENTS

| | | | |
|---|---|---|---|
| 2,910,980 | 11/1959 | Stewart | 128—152 |
| 3,097,059 | 7/1963 | Hoffman | 264—222 |

ROBERT F. WHITE, Primary Examiner

T. E. BALHOFF, Assistant Examiner

U.S. Cl. X.R.

128—152; 264—222, 248, 271, 313, Digest 30